United States Patent
Hessinger

[15] 3,636,802
[45] Jan. 25, 1972

[54] BAR-TURNING MACHINE
[72] Inventor: William A. Hessinger, North Tonawanda, N.Y.
[73] Assignee: Teledyne, Inc., Los Angeles, Calif.
[22] Filed: Dec. 29, 1969
[21] Appl. No.: 888,560

[52] U.S. Cl. ............................................................. 82/2.5
[51] Int. Cl. .............................................................. B23b 13/02
[58] Field of Search ........................ 82/2.5, 2.7, 25, 38; 29/27

[56] References Cited

UNITED STATES PATENTS

| 3,101,019 | 8/1963 | LeLan ....................................... 82/2.5 |
| 2,399,315 | 4/1946 | Beird ........................................ 82/25 |
| 2,395,365 | 2/1946 | Wilson et al. ............................ 82/25 X |
| 3,486,209 | 12/1969 | Shultz et al. ............................. 29/27 |
| 1,976,072 | 10/1934 | Howard .................................... 82/25 |

FOREIGN PATENTS OR APPLICATIONS

| 1,188,001 | 7/1968 | Great Britain .......................... 82/2.5 |

*Primary Examiner*—Leonidas Vlachos

[57] ABSTRACT

In U.S. Pat. No. 2,635,499 issued to M. R. Karge, there is described an apparatus for turning slender work. My invention includes improvements on the machine of Karge in that I provide a double tool arrangement for cutting the workpiece or bar from opposite sides and additionally I provide a turret-type template assembly and means for retrieving shaped workpieces by means of reduced air pressure.

3 Claims, 3 Drawing Figures

PATENTED JAN 25 1972 3,636,802

William A. Hessinger INVENTOR

BAR-TURNING MACHINE

In turning long or slender rods in a lathe or similar machine tool it has been the general practice to use a steady rest when the workpiece needs support of the free end. This has often proved to be unsatisfactory, however, since the cutting or shaping tool has often been a considerable distance from any point of support. The above-mentioned patent discloses a construction in which one end of a rod or other workpiece is clamped in a chuck and the other support for the rod is a slipping chuck which guides the workpiece and is placed only a few inches or less from the tool and moves along the rod with the tool. By means of this construction the tool is always closely spaced from the slipping guide and very long or slender rods may easily be turned by feeding successive portions of the rod into the machine sequentially.

An object is to provide a lathe or other turning machine with means for shaping long or slender rods.

Another object is to provide a machine for shaping rods with a plurality of shaping tools placed on opposite sides of a workpiece or at different angular positions around the rod or other workpiece.

A further object is to provide a turning machine or lathe with a template assembly which can be rotated or shifted otherwise to bring into effective position a plurality of templates any one of which can be used in conjunction with tracer or template-followed means.

An additional object is to provide hydraulic, pneumatic, or suction-producing means for retrieving shaped workpieces and to provide a yielding force on a template-tracing element.

Another object is to provide turret means for positioning templates or shaping tools.

Other objects will be evident in the following description.

Figure 1:
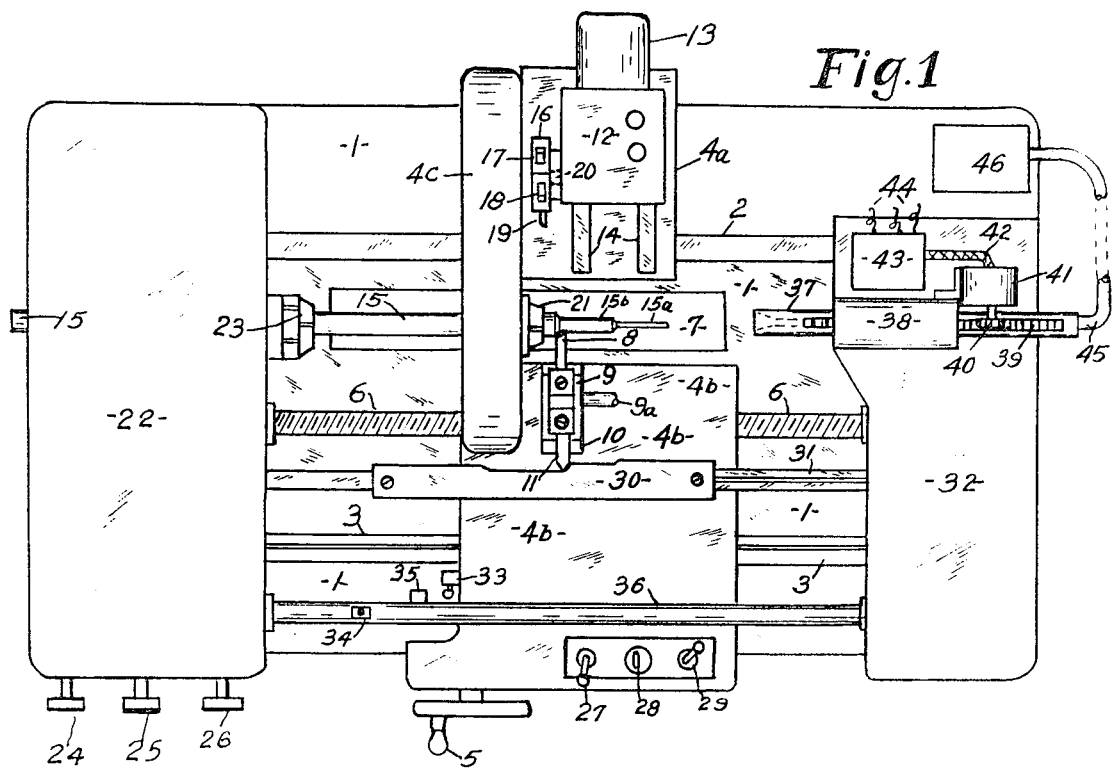
FIG. 1 is a top plan view of a lathe or other turning machine, and having the various features described in the objects listed above.

In FIG. 1 machine bed 1 supports tracks or ways 2 and 3 which serve as supports and guides for the slide or carriage comprising members 4a, 4b, and 4c, which can be moved to the right or left along rails or guides 2 and 3 by manually turning handle 5 or by means of threaded rod 6 which can be made to turn by adjusting a suitable control on the machine. The track 3 is shown as being of generally wedge-shaped construction and track 2 may be flat as indicated or rounded or of any suitable cross section.

Open space 7 in the bed allows chips from cutting or shaping tool 8 to fall into a receptacle. This tool is fastened in slide 9 which is slidable in elongated keyway or slot 10 provided in carriage member 4b. Stylus or tracer element 11 is also fastened in slide 9 by means of screws or otherwise. Housing 12 contains gearing or equivalent mechanism to provide movement of the housing and attached drive motor 13 along tracks 14 in a direction at right angles to the axis of rod or workpiece 15. Turret 16 carries cutting or shaping tools 17, 18, and 19 and is rotatably adjustable on shaft 20 which is supported in bearings in housing 12. This turret may be rotated to desired position manually and may be fastened in position by means of a screw or pin, or it may be rotated to desired position by means of gearing or the equivalent in housing 12.

Member 4c, attached to carriage members 4a and 4b, contains means for clamping and releasing workpiece 15, the clamping being sufficient to act as an accurate guide and yet not being sufficient to prevent the rod from turning. Unit 4c may contain manual means for operating chuck 21 or it may contain hydraulic or pneumatic cylinders or the like for automatic operation.

Housing 22 is attached to lathe bed 1 and contains a motor and associated gearing or other mechanism for rotating chuck 23 which may be opened or closed manually or hydraulically, pneumatically or electrically. Controls 24, 25, 26 are provided for regulating the speed of the drive motor and operations of chuck 23 as well as other operations if desired. Similarly, controls 27, 28, 29 are provided for regulating the operation of chuck 21, rate of rotation of feed screw 6, force of tracer 11 against template 30 which is fastened to slotted bar 31 by means of screws. This bar extends from housing 22 to housing 32 also attached to bed 1. The template may be adjusted to various positions along bar 31 and clamped in desired position by means of screws or the equivalent, together with clamps. The motor contained in housing 22 may also drive feed screw 6 which moves carriage 43 to the right or left, according to the direction of rotation of threaded rod or screw 6. Details of the prior construction can be obtained from the above-mentioned U.S. Pat. No. 2,635,499.

Switch 33 is connected in a suitable programming circuit and lugs 34 and 35 adjustable along programming rod 36, serve to operate switch 33 at preset times or positions of carriage 4b. Rod 36 may be rotated in steps or continuously by mechanism in housing 22.

Tube 37, having a flared mouth, is longitudinally movable in surrounding tube 38 fastened to housing or frame 32. Rack teeth 39 are provided in tube 37 and pinion 40 of motor 41 is meshed with the rack teeth. This motor is attached to tube 38 or to frame or housing 32 and may be driven in desired direction by current supplied through multiconductor cable 42 connected with controls in box 43 which may be supplied electrical energy by means of conductors 44. These conductors may be connected with suitable controls in housing 22, or otherwise. The tube 37 may be shifted pneumatically if desired and flexible air tube 45 may be connected with tube 37 and to pressure and suction pump 46 so that air may be forced or drawn through tube 37, as desired, for purposes which will be explained later. Of course, tube 37 can be moved pneumatically or in similar manner, if desired.

In operation, rod 15 is placed in chucks 23 and 21 and chuck 23 is closed or tightened so that the rod will be rotated when chuck 23 is turned. A small portion of the rod may project beyond chuck 21 which is tightened enough to guide and support the rod but not sufficiently to prevent the rod from turning in the chuck. Hydraulic or pneumatic pressure is applied to a cylinder-actuating tracer 11 so that this tracer will track template 30 as screw 6 is turned to cause carriage 4b and attached parts to move to the left so that tool 8 will first engage rod 15 to cut slender portion 15a of the rod and then to cut portion 15b. It should be noted that cutting tool 8 is always near chuck 21 which supports rod 15 adequately. As the tool is moved to the left the rod 15 is shaped in accordance with the configuration of template 30.

The cylinder which causes force to be exerted on tracer 11 may be placed beneath slide 9 in housing member 4b. Of course, a spring may be used to force tracer 11 yieldingly against template 30.

If the workpiece is cut off the controls in housing 22 or 32 may be manually or automatically actuated to cause movement of tube 37 to the left to encompass the workpiece portion just before it is severed. Then tube 37 is moved back to the right and control 46 may be programmed to cause suction in line 45 to hold the severed workpiece portion until it reaches a desired position at which time air pressure may be supplied through tube 45 to blow the cut workpiece portion out of tube 37 so that it will fall into a suitable receptacle.

Tools 17, 18, and 19 may be shaping tools or one of them may be a cutoff tool. In some cases it is desirable that tool 19 shall cut an oppositely inclined flare or slope as compared to the slope produced by tool 8. In order to bring tool 19 against the workpiece, rod 15, the motor 13 is energized to cause carriage 12 to move along tracks 14, carrying the turret 16 and supported tools until tool 19 engages rod 15. This engagement can be in line with tool 8 or out of alignment, as required, and tools 8 and 19 may engage the rod 15 simultaneously in some cases so that deflecting forces on the rod may be balanced to a degree. Another mode of operation is to withdraw tool 8 from the workpiece while tool 19 or one of the other turret tools engages the workpiece. This withdrawal of tool 8 may be accomplished by suitably shaping the contour of template 30 or by actuating toolholding slide 9 manually or by tape control in case a template is not used.

Turret 16 may be manually set or it may be automatically positioned by means of a tape or other programmed control. The elements 34 and 35 on programming bar 36, which may be rotated periodically, may be used to cause timed operation, or spaced operation of different components of the system. Bar 36 may carry additional elements similar to elements 34 and 35. It is believed that the construction, having cutting tools on opposite sides of a rotating workpiece, or in different angular positions relative to the workpiece, is novel. It has the advantages that faster shaping of the workpiece may be accomplished and some of the deflecting forces may be balanced out, at least partially.

Another mode of operation is to let one of the tools 17, 18, or 19 be a blunt support which can be forced against workpiece 15 on the opposite side from cutting tool 8 so that the deflecting force due to the cutting tool will be wholly or partially balanced. This mode of operation will permit a longer spacing of tool 8 from chuck 21 as well as causing reduced wear of that chuck. In this case the carriage 12 or the turret tool mounting may be of resilient construction.

Figure 2:
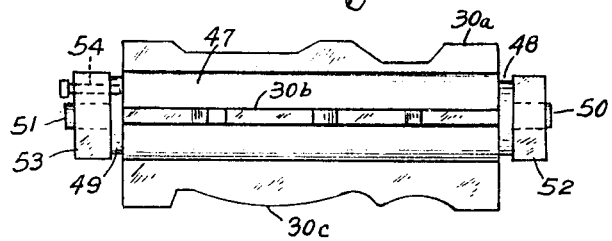
FIG. 2 is a top plan view of a turret-type template assembly.

In FIG. 2 an alternative template construction is shown. Templates 30a, 30b, and 30c are mounted on elongated hub or cylinder 47 which has attached end discs 48 and 49. Stub shafts 50 and 51 extend from respective discs 48 and 49, coaxially therewith, and those shafts are rotatable in bearings in posts 52 and 53 extending upward from carriage portion 4b, not shown in FIG. 2. Assuming that there is another template attached to cylinder or drum 47 on the opposite side from template 30b, disc 49 will be provided with four equally spaced holes into which pin 54 can be inserted in order to lock the turret-type template in any one of the four effective positions. Pin 54 is slidable in a hole in post 53 and may be urged toward disc 49 by means of a spring.

Figure 3:
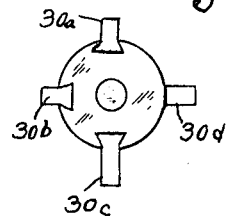
FIG. 3 is a right end elevation of the rotatable templates and supporting drum or cylinder shown in FIG. 2.

This turret-type template is quite convenient in setting up the machine for varied operations. The templates may have key portions which can be inserted in keyways in drum 47, as shown in FIG. 3, or they may have straight bottom edges as indicated by template 30d of this FIG. In either case the templates may be fastened in place by screws or the like.

What I claim is:

1. In a bar-turning machine, means including first chuck means for rotating said bar about its axis, carriage means movable in either of opposite directions parallel with said axis, slip chuck means partially tightened around said bar and carried by said carriage means coaxial with said first chuck means and serving to support said bar while allowing rotation therefore, toolholding means fastened to said carriage means adjacent said slip chuck means, a work transfer tube coaxial with said bar and having a rack extending lengthwise of said tube, means mounting said tube for movement toward or away from the shaped end portion of said bar, a motor for driving said rack and tube in either of two opposed directions by means of a pinion on the shaft of said motor and meshed with said rack, and electrical means for controlling said motor.

2. The bar-turning machine as described in claim 1 and including means for producing variation of air pressure in said tube.

3. The bar-turning machine as described in claim 2 and including control means for timing and phasing the operation of said motor and said pressure-variation-producing means.

* * * * *